(12) United States Patent (10) Patent No.: US 9,188,965 B2
Srivastava (45) Date of Patent: Nov. 17, 2015

(54) CONTROL DEVICE INCLUDING A PROTOCOL TRANSLATOR

(71) Applicant: General Instrument Corporation, Horsham, PA (US)

(72) Inventor: Apoorv Srivastava, Franklin Park, NJ (US)

(73) Assignee: ARRIS Technology, Inc., Suwanne, GA (US)

(*) Notice: Subject to any disclaimer, the term of this patent is extended or adjusted under 35 U.S.C. 154(b) by 175 days.

(21) Appl. No.: 13/787,771

(22) Filed: Mar. 6, 2013

(65) Prior Publication Data

US 2014/0253298 A1 Sep. 11, 2014

(51) Int. Cl.
*G08B 21/00* (2006.01)
*G05B 11/01* (2006.01)
(Continued)

(52) U.S. Cl.
CPC ............ *G05B 11/01* (2013.01); *G05B 19/0423* (2013.01); *G08C 17/02* (2013.01); *G08C 23/04* (2013.01); *G05B 2219/25204* (2013.01); *G08C 2201/40* (2013.01); *G08C 2201/93* (2013.01); *H04N 21/4222* (2013.01); *H04N 21/42207* (2013.01); *H04N 21/42222* (2013.01)

(58) Field of Classification Search
CPC ........... G08C 2201/20; G08C 2201/92; G08C 2201/21
USPC ........ 340/426.13, 426.14, 4.11, 12.22–12.26; 341/176; 348/734
See application file for complete search history.

(56) References Cited

U.S. PATENT DOCUMENTS 6,946,988 B2 9/2005 Edwards et al.

6,956,564 B1 10/2005 Williams
(Continued)

FOREIGN PATENT DOCUMENTS

WO 2012/177567 A1 12/2012
WO 2012/177569 A2 12/2012
(Continued)

OTHER PUBLICATIONS

J. Purcher, "Apple's Future iPen May Include a Unique Heating Element, Integrated Docking System & Work with Ordinary Paper", Patently Apple, retrieved from <www.patentlyapple.com/patently-apple/2011/07/apples-future-ipen-may-include-a-unique-heating-element-integrated-docking-system-work-with-ordinary-paper.html>, dated Jul. 7, 2011.

(Continued)

*Primary Examiner* — Mark Rushing
(74) *Attorney, Agent, or Firm* — Stewart M. Wiener

(57) ABSTRACT

Disclosed is a control device for remotely controlling other devices. The control device comprises a first device interface for transmitting control signals to a first device that is remote from the control device, a second device interface for receiving an input signal from a second device, a user interface corresponding to a function of the first device, and a protocol translator. The control signal is in accordance with a first communication protocol. The input signal is in accordance with a second communication protocol. The user interface is operable by a user so as to cause a control signal to be transmitted by the first device interface, for use by the first device. The protocol translator is configured to convert signals received by the second device interface from being in accordance with the second communication protocol to being in accordance with the first communication protocol.

20 Claims, 5 Drawing Sheets

(51) Int. Cl.
G05B 19/042 (2006.01)
G08C 17/02 (2006.01)
G08C 23/04 (2006.01)
H04N 21/422 (2011.01)

(56) References Cited

U.S. PATENT DOCUMENTS

| | | | |
|---|---|---|---|
| 7,253,765 | B2 | 8/2007 | Edwards et al. |
| 7,778,262 | B2 | 8/2010 | Beagley et al. |
| RE42,738 | E | 9/2011 | Williams |
| 8,364,680 | B2 | 1/2013 | Bilbrey |
| 2004/0036624 | A1* | 2/2004 | Ballew et al. ............ 340/825.69 |
| 2006/0152401 | A1* | 7/2006 | Spilo ............................... 341/176 |
| 2008/0291074 | A1* | 11/2008 | Tzeng et al. ................... 341/176 |
| 2009/0051563 | A1 | 2/2009 | Kuo et al. |
| 2009/0244009 | A1 | 10/2009 | Staats et al. |
| 2010/0060504 | A1* | 3/2010 | Kim ............................... 341/176 |
| 2011/0162894 | A1 | 7/2011 | Weber |
| 2011/0164000 | A1 | 7/2011 | Pance |

FOREIGN PATENT DOCUMENTS

| | | |
|---|---|---|
| WO | 2012/177571 A1 | 12/2012 |
| WO | 2012/177573 A2 | 12/2012 |

OTHER PUBLICATIONS

J. Purcher, "Apple Secretly Filed Three Dynamic Smart Pen Patents in Europe that are Chock Full of Good Ideas", Patently Apple, retrieved from <www.patentlyapple.com/patently-apple/patents-smart-pens/>, dated Feb. 28, 2013.

J. Lowensohn, "Wikipad Tablet Brings 3D and Detachable Game Controls: New 8-Inch Tablet Comes with Detachable Game Controls, a Glasses-Free 3D Screen and the Latest Version of Google's Android OS", retrieved from <news.cnet.com/8301-17938_105-57357152-1/wikipad-tablet-brings-3d-and-detachable-game-controls/>, dated Jan. 11, 2012.

J. Lowensohn, "WikiPad 3D tablet with game controller (photos)", retrieved from <www.cnet.com/2300-33374_1-10010934.html>, dated Jan. 11, 2012.

\* cited by examiner

CONTROL DEVICE INCLUDING A PROTOCOL TRANSLATOR

FIELD

The present invention relates to control devices for remotely controlling other devices.

BACKGROUND

Many consumer electronics devices, such as televisions and other displays, set-top boxes, media players, and video games consoles, may be controlled using infrared remote controllers. However, some consumer electronics devices, especially computers such as desktop or laptop computers, tablet computers, and smartphones do not support an infrared interface.

In a separate field to that of infrared controllers, protocol translators (which are also known as protocol converters) are devices that are used to translate or convert signals from one protocol language to a different protocol language. Thus, protocol translators are used to enable two different devices, that implement different respective communication protocols, to communicate with one another.

DETAILED DESCRIPTION

Figure 1:
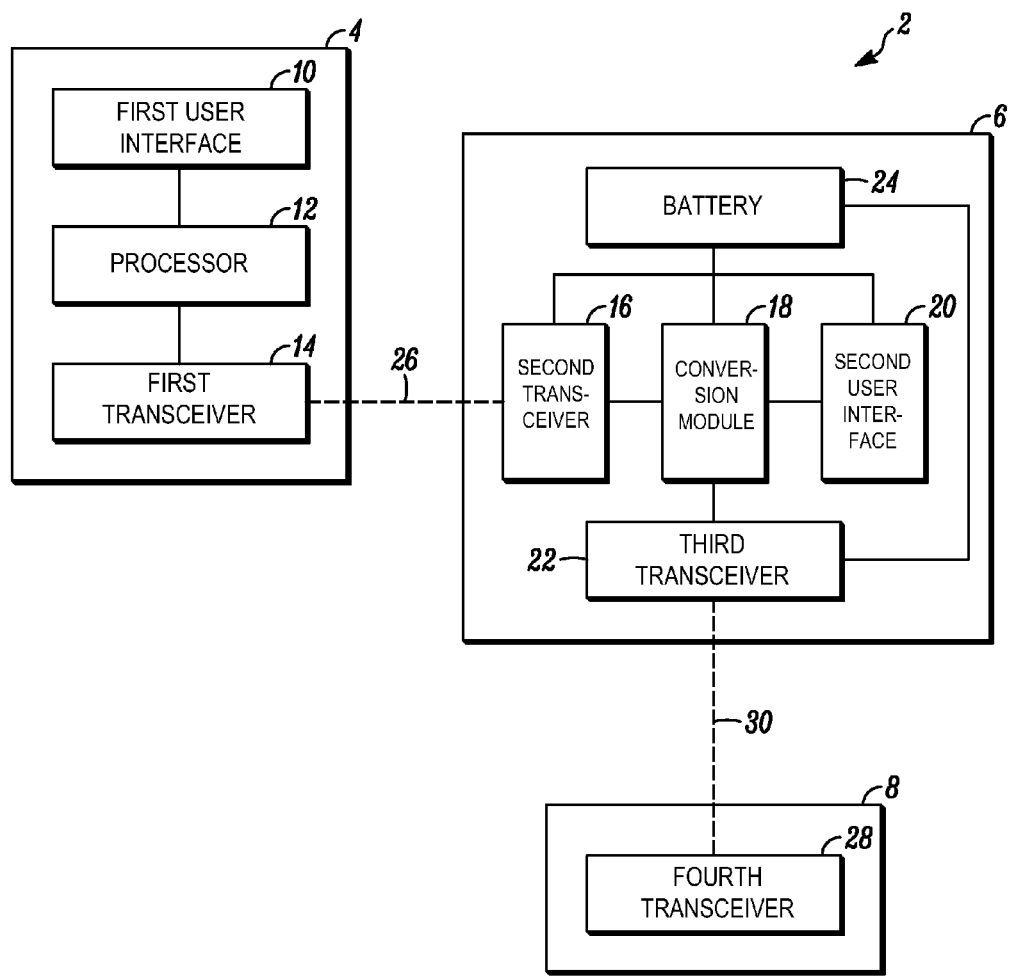
FIG. 1 is a schematic illustration showing an example system in which an embodiment of a control device is implemented.

Embodiments include a device for remotely controlling other devices (i.e., a "control device" for controlling other devices that are remote from the control device).

The control device comprises a first device interface for transmitting a control signal for use by a first device that is remote from the control device. The first device may, for example, be a television or other type of display device, a set-top box, a media player, an audio-visual device, or any other device that may be controlled remotely. This control signal is in accordance with a first communication protocol. In some embodiments, the first device interface may comprise an infrared transmitter for transmitting infrared control signals to a remote device that comprises an infrared receiver.

The control device further comprises a user interface (that may, for example, comprise remote control keys such as volume or channel changing keys, or a D-pad. The user interface corresponds to a function performable by the first device (such as increase/decrease volume, change channel etc.). The user interface is operable by a user so as to cause a first control signal to be transmitted by the first device interface to the first device, and thereby cause the first device to perform the function corresponding to that control element.

The control device further comprises a second device interface for receiving an input signal from a second device that may be remote from the control device. The second device may, for example, be a computer such as a tablet computer. A subsequent input signal sent from the second device to the control device may specify a function that is to be performed by the first device (e.g., a function that has been selected, by a user, for performance by the first device). This input signal is in accordance with a second communication protocol, which is different to the first protocol. In some embodiments, the second device interface may comprise a radio frequency (RF) receiver for receiving RF signals transmitted from a remote device that comprises an RF transmitter.

The control device further comprises a protocol translator. The protocol translator is configured to convert an input signal received from the second device interface. The input signal is converted from being in accordance with the second communication protocol to being in accordance with the first communication protocol, thereby producing a second control signal. This second control signal may then be transmitted from the first device interface to the first device, thereby causing the first device to perform a function specified by the input signal.

In some embodiments, the first device interface receives a signal from the first device. This signal may, for example, specify make and model information of the first device, or any other information that may be used to determine the functionality of the first device. This received signal is converted, by the integrated protocol translator, from being in accordance with the first communication protocol to being in accordance with the second communication protocol. The translated signal is transmitted to the second device by the second device interface. Using the received information, the second device may discern what functions or actions are capable of being performed by the first device. The second device may display those functions or actions for selection by a user.

In some embodiments, the control device further comprises one or more attachment components (e.g., one or more magnets or clips) for detachably attaching the control device to the second device. In some embodiments, when the control device is attached (via the attachment components) to the second device, the attachment components provide for charging (e.g., inductive charging) of a battery of the control device by a power source or power supply of the second device.

In some embodiments, the control device further comprises one or more sensors or additional components such as an accelerometer, a microphone, a speaker, or a camera. Measurements taken by those sensors may be sent, by the second device interface, to the second device for processing by the second device.

The following description is based on embodiments of the invention and should not be taken as limiting the invention with regard to alternative embodiments that are not explicitly described herein.

Apparatus for implementing any of the below described arrangements, and performing any of the below described method steps, can be provided by configuring or adapting any suitable apparatus, for example, one or more computers or other processing apparatus or processors, and/or providing additional modules. The apparatus can, for example, include a computer, a network of computers, or one or more processors, for implementing instructions and using data, including instructions and data in the form of a computer program or plurality of computer programs stored in or on a machine readable storage medium such as computer memory, a computer disk, ROM, magnetic or optical media, solid state media, etc., or any combination of these or other storage media.

It should be noted that certain of the process steps depicted in the below described process flowcharts (i.e., FIGS. 5 and 6) may be omitted or such process steps may be performed in differing order to that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Referring now to the figures, FIG. 1 is a schematic illustration (not to scale) showing an example system 2 in which an embodiment of a control device is implemented.

The system 2 comprises a computer 4, a control device 6, and a audio-visual device 8.

In this embodiment, the computer 4 is a tablet computer. However, in other embodiments the computer 4 is a different type of computer, examples of which include, but are not limited to, a desktop personal computer, a laptop computer, a mobile station, an entertainment appliance, a wireless telephone, a smartphone, a netbook, a game console, etc.

The computer 4 comprises a user interface (which is hereinafter referred to as the "first user interface" and indicated in FIG. 1 by the reference numeral 10), a processor 12, and a transceiver (which is hereinafter referred to as the "first transceiver" and indicated in FIG. 1 by the reference numeral 14). In this embodiment, the first transceiver 14 is a radio frequency (RF) transceiver. However, in other embodiments, the first transceiver 14 is a different type of transceiver.

The first user interface 10 is any appropriate device or devices using which a user of the computer 4 may input, into the computer 4, for use by the computer 4, a command, an instruction or other information. In this embodiment, the first user interface 10 includes a touch screen display, as described in more detail later below with reference to FIG. 2. Examples of other appropriate user interfaces, that may be used instead of or in addition to the touch screen display include, but are not limited to, a keyboard, a mouse, and a microphone coupled to a voice recognition module. The first user interface 10 is coupled to the processor 12 such that information may be sent between the first user interface 10 and the processor 12, as described in more detail later below with reference to FIGS. 5 and 6.

In addition to being coupled to the first user interface 10, the processor 12 is coupled to the first transceiver 14 such that information may be sent between the processor 12 and the first transceiver 14, as described in more detail later below with reference to FIGS. 5 and 6. The processor 12 is configured to process information received by it. For example, as described in more detail later below with reference to FIG. 6, in some embodiments the processor 12 processes a signal received from the first user interface 10 that specifies a user command. The processor 12 processes this user command signal to convert that signal into a control signal that is understandable, i.e., useable, by the control device 6. The processor 12 then sends the control signal to the first transceiver 14 for transmission. The processor 12 may implement any appropriate software or application to process received signals.

The first transceiver 14 is configured to transmit signals (i.e., RF signals in this embodiment) corresponding to information (e.g., a control signal) received by the first transceiver 14 from the processor 12. In the example system 2, these transmitted RF signals are for use by a device that may be remote from the computer 4 (in particular, the control device 6). Furthermore, the first transceiver 14 is configured to receive RF signals from devices that may be remote from the computer 4 (in particular, the control device 6). In use, a signal received by the first transceiver 14 is sent from the first transceiver 14 to the processor 12. In some embodiments, the first transceiver 14 is configured to send/receive a different type of signal instead of or in addition to RF signals.

The control device 6 comprises transceiver (which is hereinafter referred to as the "second transceiver" and indicated in FIG. 1 by the reference numeral 16), a conversion module 18, a user interface (which is hereinafter referred to as the "second user interface" and indicated in FIG. 1 by the reference numeral 20), a further transceiver (which is hereinafter referred to as the "third transceiver" and indicated in FIG. 1 by the reference numeral 22), and a battery 24.

In this embodiment, the second transceiver 16 is a radio frequency (RF) transceiver. However, in other embodiments, the second transceiver 16 is a different type of transceiver. The second transceiver 16 is configured to receive signals (i.e., RF signals in this embodiment) from devices that may be remote from the control device 6 (in particular, the computer 4). The second transceiver 16 is connected to the conversion module 18 such that information may be sent between the second transceiver 16 and the conversion module 18. A signal received by the second transceiver 16 is sent from the second transceiver 16 to the conversion module 18. Furthermore, the second transceiver 16 is configured to transmit RF signals corresponding to information received by the second transceiver 18 from the conversion module 18. In the example system 2, these transmitted RF signals are for use by a device that is remote from the control device 6 (in particular, the computer 4). In some embodiments, the second transceiver 16 is configured to send/receive a different type of signal instead of or in addition to RF signals.

Thus, in the example system 2, the first and second transceivers 14, 16 are configured so as to enable wireless two-way communication between the computer 4 and the control device 6. The transceivers 14, 16 may implement any appropriate RF protocol to enable such two-way wireless communication. Examples of such RF protocols include, but are not limited to, a ZigBee communication protocol, a Radio Frequency for Consumer Electronics (RF4CE) communication protocol, Bluetooth, Bluetooth Low Energy, and Wi-Fi. In some embodiments, one or more different types of transceiver or interface, and one or more different types of communication protocols may be used (instead of or in addition to the RF communication protocol) to provide communication between the computer 4 and the control device 6. The wireless communication link between the first and second transceivers 14, 16 is indicated in FIG. 1 by a dotted line and the reference numeral 26.

The conversion module 18 is configured to process information received by it. For example, as described in more detail later below with reference to FIG. 6, in some embodiments the conversion module 18 is configured to process a signal received by it from the second transceiver 16. This signal can, for example, be the command signal corresponding to a user input to the computer 4. The conversion module 18 is configured to demodulate and/or decode the user control signal to extract desired information, and then translate or convert that extracted information into a predetermined communication language (e.g., an infrared communication protocol language) for sending to another device (in particular, the audio-visual device 8). The conversion module 18 may implement any appropriate software or application to process received signals. In addition to being coupled to the second transceiver 16, the conversion module 18 is coupled to the second user interface 20. This is such that information may be sent between the conversion module 18 and the second user interface 20, as described in more detail later below with reference to FIG. 5. Also, the conversion module 18 is coupled to the third transceiver 22. This is such that information may be sent between the conversion module 18 and the third transceiver 22, as described in more detail later below with reference to FIGS. 5 and 6.

The second user interface 20 is any appropriate device or devices using which a user of the control device 6 may input, into the control device 6, for use by the control device 6, a command, an instruction, or other information. In this embodiment and as described in more detail later below with reference to FIG. 3, the second user interface 20 includes a plurality of remote control buttons located on a surface of the control device 6. Examples of other appropriate user interfaces that may be used instead of or in addition to the plurality of remote control buttons include, but are not limited to, a display (e.g., a touch screen display), a touch pad, and a click wheel. As mentioned above, the second user interface 20 is coupled to the conversion module 18 such that information (e.g., a signal specifying a remote control button that has been pressed) may be sent between the second user interface 20 and the conversion module 18.

The third transceiver 22 is any appropriate type of transceiver, for example, an infrared (IR) transceiver or a radio frequency (RF) transceiver. The third transceiver 22 is configured to transmit signals (e.g., IR and/or RF signals) corresponding to information received by the third transceiver 22 from the conversion module 18. In the example system 2, the signals transmitted by the third transceiver 22 are for use by one or more of the devices that are remote from the control device 6. In particular, the signals transmitted by the third transceiver 22 are for controlling the audio-visual device 8. Furthermore, the third transceiver 22 is configured to receive signals (e.g., IR and/or RF signals) from devices that are remote from the computer 4 (in particular, the audio-visual device 8). In use, a signal received by the third transceiver 22 is sent from the third transceiver 22 to the conversion module 18.

The battery 24 is coupled to the second transceiver 16, the conversion module 18, the second user interface 20, and the third transceiver 22 such that those components 16-22 are powered by the battery. The battery 24 is a rechargeable battery that may be charged, e.g., as described in more detail later below with reference to FIG. 4.

The audio-visual device 8 is any appropriate type of device that is capable of being controlled using a signal, e.g., an optical signal, an IR signal, or an RF signal transmitted from a device that is remote from the audio-visual device 8. Examples of such audio-visual devices include, but are not limited to, a set-top box, a media player, a desktop or laptop computer, a tablet computer, a smartphone, or any other type of mobile device, or another type of display device such as a monitor or television. The audio-visual device 8 comprises a transceiver (which is hereinafter referred to as the "fourth transceiver" and is indicated in FIG. 1 by the reference numeral 28). The fourth transceiver 28 is configured to receive signals from a device that is remote from the audio-visual device 8 (in particular, the control device 6). In use, a signal received by the audio-visual device 8 (i.e., by the fourth transceiver 28) is processed by the audio-visual device 8 so that the receiving audio-visual device 8 performs an action or function specified by that received signal.

Furthermore, in some embodiments, the fourth transceiver 28 is configured to transmit signals (e.g., IR or RF signals) to a device that is remote from the audio-visual device 8 (in particular, the control device 6). For example, the audio-visual device 8 may transmit a signal that indicates the identity of the audio-visual device 8 to the control device 6.

Thus, in the example system 2, the third transceiver 22 and the fourth transceiver 28 are configured so as to enable wireless two-way communication between the control device 6 and the audio-visual device 8. The transceivers 22, 28 may implement any appropriate communication protocol to enable such two-way wireless communication. In some embodiments, the transmission of signals between the control device 6 and the audio-visual device 8 requires an unobstructed path (i.e., line-of-sight) between the third and fourth transceivers 22, 28. Any appropriate interfaces or transceivers, and any appropriate communication protocols may be used to provide for communication between the control device 6 and the audio-visual device 8. Such interfaces or transceivers may, for example, not require line-of-sight between the transceivers. The wireless communication link between the third transceiver 22 and the fourth transceiver 28 is indicated in FIG. 1 by a dotted line and the reference numeral 30.

For convenience and ease of understanding, the example system 2 comprises a single audio-visual device 8. However, in some embodiments, there is a plurality of different devices, each of which comprises a transceiver or receiver, and each of which may be controlled using a control signal. It will be understood that the methods and apparatus described herein are equally applicable to systems that comprise a plurality of audio-visual devices.

Figure 2:
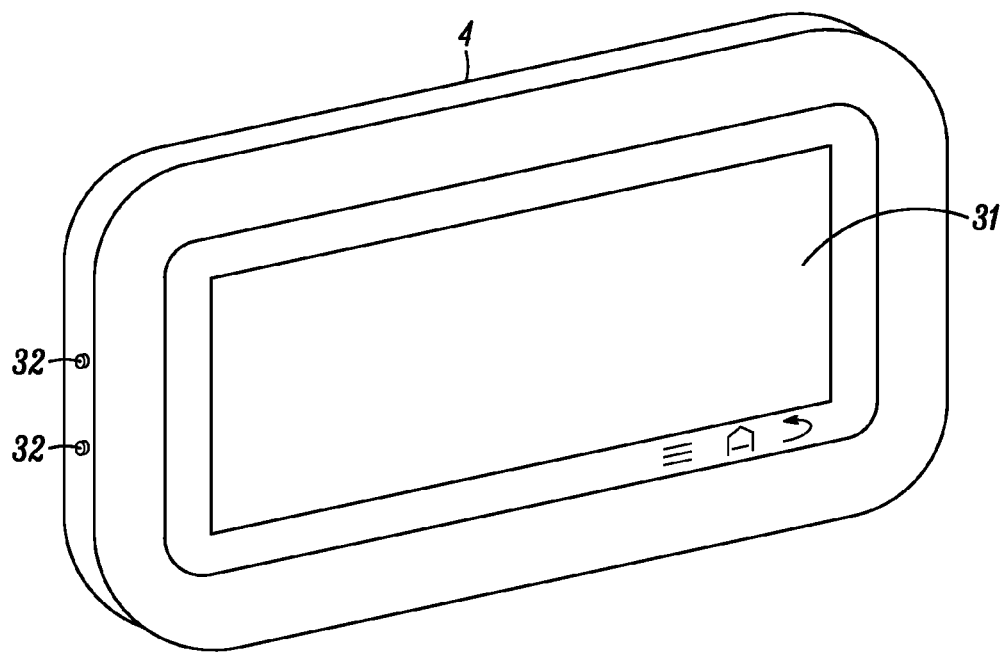
FIG. 2 is a schematic illustration showing a perspective view of an example of a computer for use in accordance with an embodiment.

FIG. 2 is a schematic illustration (not to scale) showing a perspective view of the computer 4 used in this embodiment.

In this embodiment, the computer 4 is a tablet computer. However, as mentioned above, in other embodiments the computer 4 is a different type of computer.

In this embodiment, the first user interface 10 includes a touch screen display 31. A user of the computer 4 may input commands, instructions, or other information into the computer 4 using the touch screen display 31. For example, a user may input information into the computer 4 by performing one or more appropriate touch screen gestures which comprise the user touching the touch screen 31 with one or more of their digits or another object (e.g., a stylus). In operation, the input information is then processed by the processor 12. Furthermore, the touch screen display 31 may be used to display information to a user of the computer 4. For example, as described in more detail later below with reference to FIG. 6, a graphical user interface (GUI) may be displayed on the touch screen display 31. The user of the computer 4 may interact with the computer 4 by directly manipulating (by touching the touch screen display 31) graphical elements that the GUI uses to represent information, commands, functions, actions, etc.

In this embodiment, the computer 2 further comprises a plurality of magnets, which are collectively hereinafter referred to as the "first magnets" and are indicated in FIG. 2 by the reference numeral 32. The first magnets 32 may, for example, be located along either or both of the two short edges of the tablet computer 4. The first magnets 32 may be used to connect, or attach, the computer 4 to a further device, for example, the control device 6 (as described in more detail later below with reference to FIG. 4) or to a device that may recharge or charge a power source of the computer 4 (e.g., by inductively charging the power source of the computer 4 through the first magnets 32). The attachment of the computer 4 to a further device may be performed by bringing the first magnets 32 into contact with metal connectors or other magnets mounted on the further device.

Figure 3:
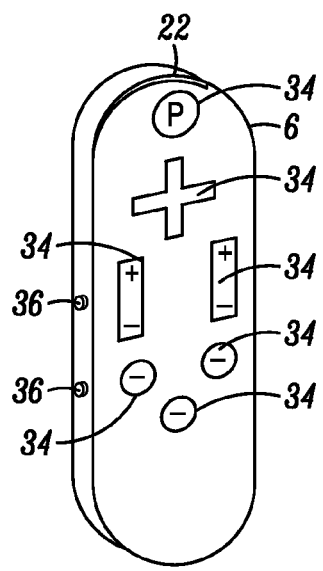
FIG. 3 is a schematic illustration showing a perspective view of an embodiment of the control device.

FIG. 3 is a schematic illustration (not to scale) showing a perspective view of the control device 6 used in this embodiment.

In this embodiment, the control device 6 is a device that a user may hold in their hand, i.e., the control device 6 is a hand-held device. The control device 6 includes an enclosure (e.g., an injection-molded enclosure formed of plastic or a material other than plastic) that contains electronic components that are functionally connected (e.g., by printed circuit boards). The control device 6 has a size and shape that is similar to that of a conventional remote control unit e.g., a remote control for controlling a television. In this embodiment, the control device 6 is an elongate device having the third transceiver 22 located at one end of the elongate control device 6.

The second user interface 20 includes a plurality of remote control buttons 34, which are located on a common surface of the control device 6. The remote control buttons 34 protrude through a top surface of the enclosure of the control device 6. Thus, in this embodiment, the control device has the appearance of a conventional remote control unit.

FIG. 3 depicts one example configuration of the remote control buttons. The control device 6 may be designed to have one of a plurality of different remote control button configurations. In this embodiment, the remote control buttons 34 of the control device 6 are keys that are common to remote control units for controlling televisions and the like. The buttons 34 include a power on/off control key, a D-pad (i.e., a cross-shaped directional pad), a volume control key, a channel changing direction key, a "menu" key, a "back" or "last" key, and a "mute" key. In some embodiments, the control device 6 comprises one or more different remote control buttons instead of or in addition to one or more of the aforementioned remote control buttons 34. For example, in some embodiments, the second user interface 20 of the control device 6 additionally comprises media playback command keys such as "play", "stop", "fast-forward", "rewind", "pause". As described in more detail later below with reference to FIG. 5, by pressing one or more of the remote control buttons 34, a user of the control device 6 may operate the control device 6 so as to control the audio-visual device 8.

In this embodiment, the control device 6 further comprises a plurality of magnets, which are collectively hereinafter referred to as the "second magnets" and are indicated in FIG. 2 by the reference numeral 36. The second magnets 36 may, for example, be located along either or both of the two long edges of the control device 6. The second magnets 36 may be used to connect, or attach, the control device 6 to a further device, for example, the computer 4 (as described in more detail later below with reference to FIG. 4) or to a device that may recharge or charge the battery 24 (e.g., by inductively charging the battery 24 through the second magnets 36). The attachment of the control device 6 to a further device may be performed by bringing the second magnets 36 into contact with metal connectors or other magnets mounted on the further device.

Figure 4:
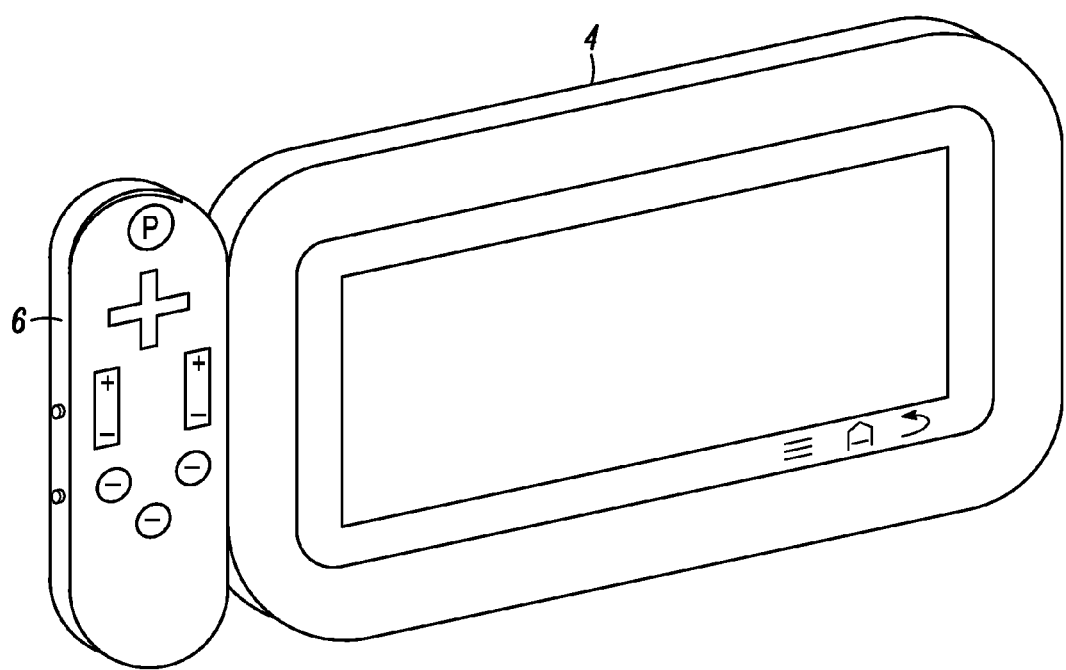
FIG. 4 is a schematic illustration showing a perspective view of the computer of FIG. 2 and the control device of FIG. 3 attached together.

FIG. 4 is a schematic illustration (not to scale) showing a perspective view of the computer 4 and the control device 6 attached together. The computer 4 and the control device 6 have been attached together by moving one or both devices 4, 6 such that the first magnets 32 are in contact with the second magnets 36. The control device 6 may be detached from the computer 4 by pulling the devices 4, 6 apart with sufficient force to overcome the magnetic attraction of the magnets 32, 36.

The connection, via the magnets 32, 36, between the computer 4 and the control device 6 is such that the control device 6 is retained by the computer 4, i.e., such that, once attached together and unless the devices 4, 6 are pulled apart with sufficient force to overcome the magnetic attraction of the magnets 32, 36, the relative positions of the computer 4 and control device 6 are maintained. Also, the connection, via the magnets 32, 36, between the computer 4 and the control device 6 is such that the battery 24 of the control device 6 may be inductively charged, via the magnets 32, 36, from the power source of the computer 4. Also, if the computer 4 is connected to an external power supply, for example the computer 4 is connected to mains electricity, the battery 24 of the control device 6 may be inductively charged from this external power supply via the computer 4 (and via the magnets 32, 36). Thus, the magnets 32, 36 may not only be used to detachable connect together the computer 4 and the control device 6, but also enable the control device 6 to be recharged by the computer 4 or a power supply connected to the computer 4. In further embodiments, the control device 6 may have other or additional charging capabilities, e.g., the control device 6 may also be charged through a separate charger, or may have removable batteries.

In other embodiments, different components for detachably attaching together the computer 4 and the control device 6 may be used instead of or in addition to the magnets 32, 36. For example, in some embodiments the control device 6 comprises a clip that may be used to clip the control device 6 onto a portion of the computer 4. The control device 6 may be subsequently unclipped from the computer 4 in order to separate the devices 4, 6. In some embodiments, locator pins (for example) may be used to detachably attach the devices 4, 6. Preferably, the components for detachably attaching together the computer 4 and the control device 6 allow the control device 6 to be attached to either side of the computer 4 (i.e., a user may attach the control device to the right-hand side, or the left hand side of the computer 4 in accordance with their preference).

In some embodiments, the physical connection between the computer 4 and the control device 6 is such that information may be sent between the processor 12 of the computer 4 and the conversion module 18 of the control device 6 via that physical connection. Thus, information may be sent between the processor 12 and the conversion module 18 via the physical connection between the devices 4, 6 as opposed to as an RF signal being sent between the RF transceivers 14, 16. For example, in some embodiments, the computer 4 and the control device 6 may be connected via a USB jack on one of those devices, and a USB port on the other device. This connection may be such that the devices 4, 6 are attached together and such that information may be passed between the devices 4, 6.

Figure 5:
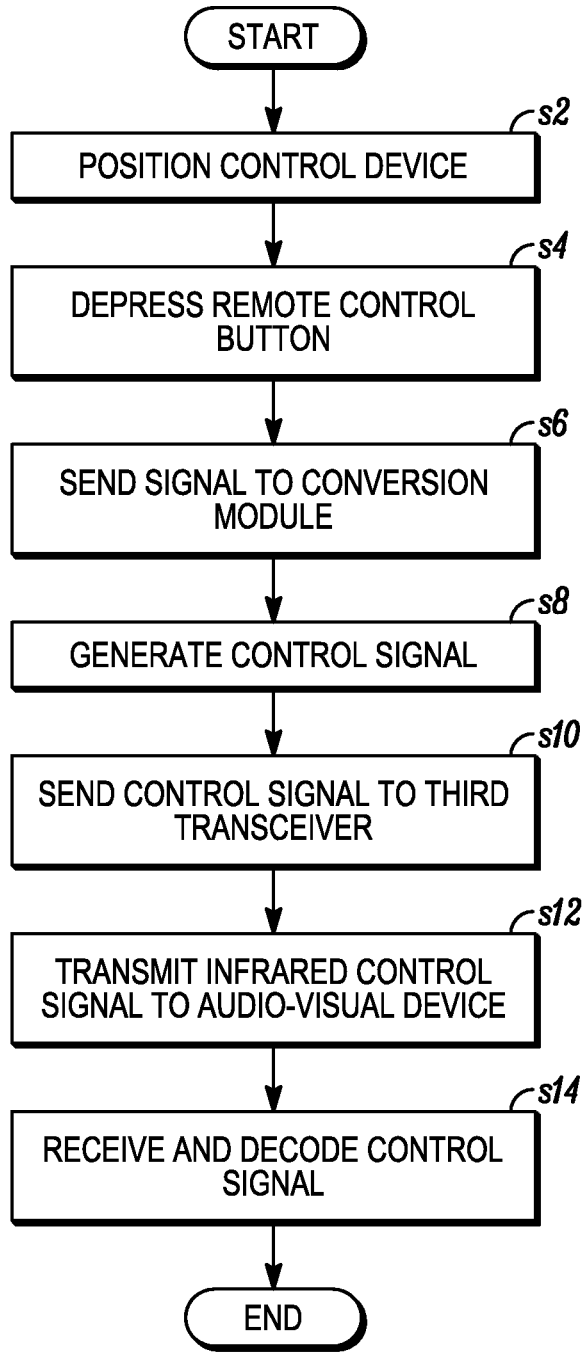
FIG. 5 is a process flow chart showing certain steps of an example method of an embodiment of the control device.

FIG. 5 is a process flow chart showing certain steps of an example method of using the above described embodiment of the control device 6.

In this example process, the computer 4 and the control device 6 may be attached together (e.g., as shown in FIG. 4 and described above), or may be detached from one another (i.e., the computer 4 and the control device 6 may be remote from one another).

At step s2, a user of the control device 6 "points" the control device at the audio-visual device 8. In other words, the user positions the control device 6 such that a path between the third transceiver 22 (of the control device 6) and the fourth transceiver 28 (of the audio-visual device 8) is unobstructed (i.e., such that there is "line-of-sight" between the third and fourth transceivers 22, 28).

Even though the computer 4 and the control device 6 may be attached together, preferably at step s2, the control device 6 is detached from the computer 4. When detached from the computer 4, the control device 6 tends to be easier to move and orientate by a user compared to when the control device 6 is attached to the computer 4. This is because the detached control device 6 is considerably less bulky than the combined computer 4 and control device 6.

At step s4, the user of the control device 6 presses a remote control button 34 corresponding to an action they wish the audio-visual device 8 to perform (e.g., the user may press the "power on/off" key if they wish the audio-visual device 8 to switch on/off). In other words, the user inputs a command into the second user interface 20 of the control device 6.

At step s6, a signal corresponding to the depressed remote control button 34 (i.e., a signal specifying a user command) is transmitted, from the second user interface 20, to the conversion module 18.

At step s8, the conversion module 18 processes the received signal and generates control signal that specifies the action or function associated with the depressed remote control button 34 (e.g., the control signal may specify a "turn on/off" action). The control signal is specified in a predetermined communication protocol language, e.g., an infrared communication protocol language that is understandable by the audio-visual device 8.

At step s10, the control signal is sent from the conversion module 18 to the third transceiver 22.

At step s12, the third transceiver 22 transmits, (e.g., as an infrared signal in accordance with an infrared communication protocol) the control signal to the fourth transceiver 22 of the audio-visual device 8.

At step s14, the audio-visual device 8 receives and decodes the received control signal and subsequently performs the action specified by the control signal (e.g., the audio-visual device 8 may turn on or off depending on its current state).

Thus, an example method of using the control device 6 is provided. In this example method, the control device 6 is used as a remote control unit for controlling the audio-visual device 8. In other words, a user may operate the control device 6 (i.e., by directly inputting control commands into the device using the remote control keys 34) in order to remotely control the audio-visual device 8 so as to perform an action. Advantageously, the user may operate the control device 6 so as to remotely control a different device in a similar fashion to how they would operate a conventional remote control unit.

Figure 6:
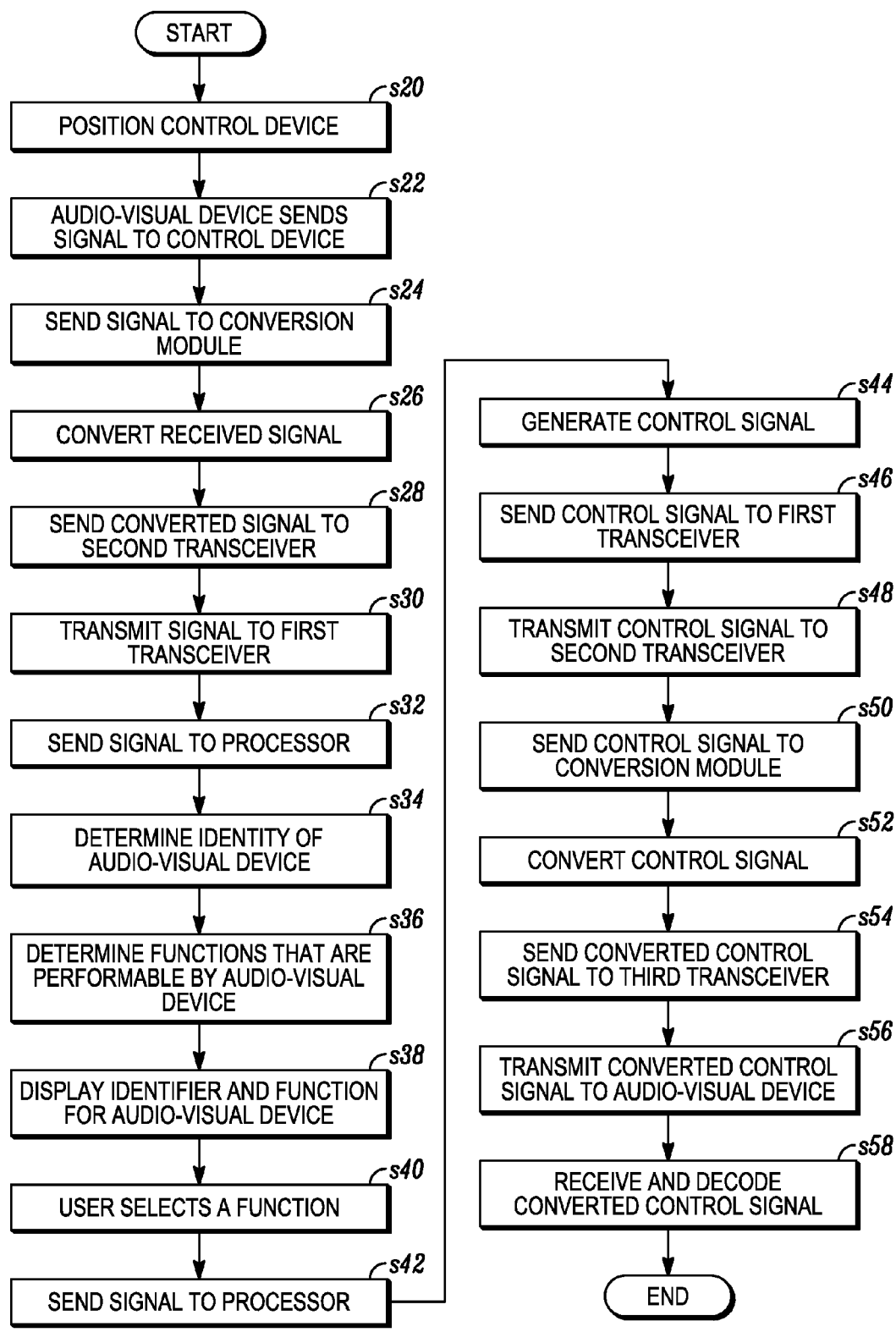
FIG. 6 is a process flow chart showing certain steps of a further example method of using an embodiment of the control device.

FIG. 6 is a process flow chart showing certain steps of a further example method of using the above described embodiment of the control device 6.

In this example process, the computer 4 and the control device 6 may be attached together (e.g., as shown in FIG. 4 and described above), or may be detached from one another (i.e., the computer 4 and the control device 6 may be remote from one another).

At step s20, a user of the control device 6 "points" the control device at the audio-visual device 8. In other words, the user positions the control device 6 such that a path between the third transceiver 22 (of the control device 6) and the fourth transceiver 28 (of the audio-visual device 8) is unobstructed (i.e., such that there is "line-of-sight" between the infrared transceivers 22, 28).

Even though the computer 4 and the control device 6 may be attached together, preferably at step s2, the control device 6 is detached from the computer 4. As mentioned above, when detached from the computer 4, the control device 6 tends to be easier to move and orientate by a user compared to when the control device 6 is attached to the computer 4. Also, when detached from the control device 6, the user is relatively free to orientate and position the computer 4 as desired (i.e., as is convenient or comfortable for the user) while still maintaining an unobstructed path between the control device 6 and the audio-visual device 8.

At step s22, the audio-visual device 8 sends (e.g., as an infrared signal), via the fourth transceiver 28, a signal that species the identity of the audio-visual device 8 to the third transceiver 22 of the control device 6. For example, the signal may specify a make/model type of the audio-visual device 8. In some embodiments, instead of or in addition to specifying the identity of the audio-visual device 8, the signal sent from the audio-visual device 8 may specify information (e.g., a URL) that may be used (e.g., by the computer 4) to determine the identity of the audio-visual device 8.

In some embodiments, the signal specifying the identity of the audio-visual device 8 may, for example, be sent from the audio-visual device 8 in response to the audio-visual device 8 receiving a request (e.g., from the control device 6) for that information. Similarly, in some embodiments, the signal specifying the identity of the audio-visual device 8 may, for example, be sent after a handshaking process has been performed to set parameters of the communications between the control device 6 and the audio-visual device 8.

At step s24, the signal specifying the identity of the audio-visual device 8 is sent from the third transceiver 22 to the conversion module 18.

At step s26, the conversion module 18 translates, or converts, the received signal into a predetermined RF communication protocol language. This RF communication protocol language is understandable by the computer 8. The translated signal is for transmission to the computer 4. The translated signal specifies the identity of the audio-visual device 8.

At step s28, the translated signal is sent from the conversion module 18 to the second transceiver 16.

At step s30, the second transceiver 16 transmits, as an RF signal, the translated signal specifying the identity of the audio-visual device 8 to the first transceiver 14 of the computer 4.

At step s32, the signal received by the first transceiver 14 is sent to the processor 12.

At step s34, the processor 12 processes (i.e., decodes) the received signal to determine the identity of the audio-visual device 8.

At step 36, using the determined identity of the audio-visual device 8, the processor 12 determines what functions are performable by the audio-visual device 8. In other words, the processor 12 determines functions or actions that the audio-visual device 8 may be operated to perform. Any appropriate process may be performed by the processor 12 to determine the functions performable by the audio-visual device 8. For example, the processor 12 may look up, via the Internet, in a database of functions, which functions are performable by the audio-visual device 8. Alternatively, for example, the processor 12 may download, over the Internet, information relating to the functions performable by the audio-visual device 8.

If, for example, the audio-visual device 8 is a television, using the make and/or model of that television (determined at step s34), the processor 12 may determine (e.g., using information supplied by a manufacturer of the television) what functions or actions that television is capable of performing.

Thus, steps s22 to s36 of the process of FIG. 5 describe a method by which the processor 12 may determine or discern the identity of the audio-visual device 8 and some or all of the functions that device 8 is capable of performing. However, in other embodiments, some or all of this information may be acquired by the computer 4 in a different way. For example, in some embodiments, the user of the computer 4 may input (using the first user interface 10), the make/model of the audio-visual device 8, and the processor may then retrieve function information for the audio-visual device 8 from an online source. Alternatively, the user of the computer 4 may input into the computer 4 both identity and function information for the audio-visual device 8.

At step s38, the processor 12 displays, on the touch screen display 31 of the first user interface 10, an identifier for the audio-visual device 8. The processor 12 also displays a list of the functions or actions that the audio-visual device 8 s capable of performing. The information displayed at step s36 may be presented on the display 31 to the user of the computer 4 in any appropriate format. For example, the processor 12 may present the information using a GUI. The GUI may be used to arrange the information in an intuitive way. For example, in embodiments in which there are a plurality of audio-visual devices each of which may be operated to perform a plurality of different functions, the device/function information may be presented using the GUI in such a way that a user may navigate the information so as to quickly and efficiently identify a particular audio-visual device and a particular function for that audio-visual device.

At step s40, using the first user interface 10, the user selects a function that they wish the audio-visual device 8 to perform. For example, the user may touch, on the touch screen display 31, an icon corresponding to the function that they wish the audio-visual device 8 to perform. In other words, the user inputs a command into the first user interface 10 of the computer 4.

At step s42, a signal specifying the selected function is sent from the first user interface 10 to the processor 12.

At step s44, the processor 12 processes the received signal (i.e., the signal that specifies the function selected by the user, i.e., the user command signal) to generate a control signal for use by the control device 6.

At step s46, the control signal generated by the processor 12 is sent from the processor 12 to the first transceiver 14.

At step s48, the first transceiver 14 transmits, using an appropriate RF communication protocol, i.e., as an RF signal, the control signal to the second transceiver 16 of the control device 16.

The use of an RF communication protocol to transmit information (i.e., the control signal) between the computer 4 and the control device 6 advantageously tends to means that a direct line-of-sight (i.e., an unobstructed path) between the RF transceivers 14, 16 is not necessary. In other words, the control signal may be transmitted between the computer 4 and the control device 6 even if there is no direct line-of-sight between the RF transceivers 14, 16. Thus the user of the computer 4 may position/orientate the computer 4 in a position that is comfortable and convenient for the user. The signal specifying the function that is to be performed by the audio-visual device 8 is still transmitted to, and received by, the control device 6 despite there being no line-of-sight between the devices 4, 6.

At step 50, the second transceiver 16 receives the control signal, and sends the received control signal to the conversion module 18.

At step s52, the conversion module 18 translates, or converts, the received control signal from being in the RF communication protocol language, to being in a different language, e.g., a predetermined infrared communication protocol language that is understandable by the audio-visual device 8. The translated signal is for transmission to the audio-visual device 8. The translated signal specifies the function or action that was selected by the user at step s40.

At step s54, the translated signal is sent from the conversion module 18 to the third transceiver 22.

At step s56, the third transceiver 22 transmits (e.g., as an infrared signal) the translated signal to the fourth transceiver 22 of the audio-visual device 8.

At step s58, the audio-visual device 8 receives and decodes the received translated signal and subsequently performs the action or function specified by the translated signal (i.e., the audio-visual device 8 performs the action or function specified by the user at step s40).

Thus, a further example method of using the control device 6 is provided. In this example method, the control device 6 is used a protocol translator or protocol bridge. In particular, in this further example, the control device provides for communication between two different devices (i.e., the computer 4 and the audio-visual device 8) that implement different communication protocols. In other words, the control device 6 advantageously allows a user to remotely control the operation of a device (that is configured to be operated and communicate using a first communication protocol) using a different device (that is configured to communicate using a second communication protocol that is different to the first communication protocol).

In the further example, the control signal specifying the function or action that the user wishes the audio-visual device 8 to perform is relayed from the computer 4 to the audio-visual device 8 via the control device 6. As the computer 4 and the control device 6 communicate using an RF communication protocol, an unobstructed path (i.e., line-of-sight) between those two devices is not required. Also, since the control device 6 may be detached from the computer 4 and positioned such that there is an unobstructed path between the control device 6 and the audio-visual device 8, advantageously, an unobstructed path (i.e., line-of-sight) between the computer 4 and the audio-visual device 8 is not required. Thus, when operating the computer 4 to control the audio-visual device 8, the user may orientate the computer 4 as they wish. Also, when operating the computer 4 to control the audio-visual device 8, the user may do so from a location that is within RF communication range of the control device 6. For example, the user may control an audio-visual device located in one room of a building, using the computer 4 located in a different room.

The above described control device is a wireless hand-held device.

The above described control device advantageously tends to be capable of translating or converting signals from one format into another, e.g., from RF signals to infrared signals and vice versa. The above described control device is configured to be able to act as both a remote control unit that a user may use to control an audio-visual device, and also a protocol translator that enables an audio-visual device to be controlled using a device that ordinarily may not be capable of being used to control an that device.

The control device advantageously provides interoperability between devices that implement different communication protocols.

Being able to attach the control device to the computer advantageously provides that the control device may be charged from the tablet and also tends to reduce the likelihood of the control device being lost. Being able to detach the control device from the computer advantageously allows the control device to be operated as a standalone remote control unit and tends to allow for one-handed operation by the user. Also, being able to detach the control device from the computer advantageously allows the computer to be orientated and located as the user wishes, while maintaining line-ofsight between the control device and the audio-visual device, thereby allowing the audio-visual device to be controlled from the computer.

The control device advantageously adds functionality to the computer. In particular, the ability of being able to be used to control audio-visual devices is added to the computer.

In the above embodiments, the control device is used to control the audio-visual device. In some embodiments, the control device may also be used to control the computer. In other words, the control device may be used as a remote control unit with which the computer may be operated. In other words, the control device may be used as a user interface for the computer.

In some embodiments, the control device comprises one or more further components in addition to those described above.

For example, in some embodiments, the control device additionally includes accelerometers and/or other sensors. Measurements from these sensors may be communicated to the computer via the RF communications link. Thus, for example, the control device may be used as a pedometer that may transmit data to the computer for processing and display. Also for example, the sensor measurements may be used when the control device is used as a remote controller for the computer. Thus, for example, the control device may be used as a video game controller for games being played on the computer.

Also for example, in some embodiments, the control device additionally includes a microphone, a speaker, and/or a camera. Using such components, the control device may, for example, be used to capture or record image or sound data that may be transmitted, via the RF communications link, to the computer for processing. Also, for example, the control device may be used as a telephone, e.g., for VOIP telephone calling through the computer. Also, for example, the control device may be used as a microphone for use with karaoke or singling/dancing video games that may be played on the computer and may also be displayed on an appropriate audio-visual device (e.g., a television).

We claim:

1. A control device comprising:
   a first device interface for transmitting a control signal for use by a first device, the control signal being in accordance with a first communication protocol, the first device being remote from the control device, and wherein the first device interface is further configured to receive a further input signal from the first device, the further input signal being in accordance with the first communication protocol;
   a second device interface for receiving an input signal from a second device, the input signal being in accordance with a second communication protocol, the second communication protocol being different to the first communication protocol, and wherein the second device interface is further configured to transmit an output signal for use by the second device, the output signal being in accordance with the second communication protocol;
   a user interface operatively coupled to the first device interface, the user interface corresponding to a function performable by the first device, the user interface being operable by a user so as to cause a first control signal to be transmitted by the first device interface; and
   a protocol translator operatively coupled to the first device interface and the second device interface, the protocol translator being configured:
      to convert the input signal received by the second device interface from being in accordance with the second communication protocol to being in accordance with the first communication protocol, thereby producing a second control signal;
      to provide, for transmission by the first device interface, the second control signal;
      to convert the further input signal received by the first device interface from being in accordance with the first communication protocol to being in accordance with the second communication protocol, thereby producing the output signal; and
      to provide, for transmission by the second device interface, the output signal.

2. The control device in accordance with claim 1, wherein the first control signal is such that, when it is received by the first device, the first device performs the function.

3. The control device in accordance with claim 1, wherein:
   the input signal specifies a further function performable by the first device; and
   the second control signal is such that, when it is received by the first device, the first device performs the further function.

4. The control device in accordance with claim 1, wherein the further input signal and the output signal specify information that is usable by the second device to ascertain that the first device may perform the further function.

5. The control device in accordance with claim 1, wherein:
   the first device interface is an infrared interface comprising an infrared transmitter; and
   the first communication protocol is an infrared communication protocol.

6. A control device comprising:
   a first device interface for transmitting a control signal for use by a first device, the control signal being in accordance with a first communication protocol, the first device being remote from the control device;
   a second device interface for receiving an input signal from a second device, the input signal being in accordance with a second communication protocol, the second communication protocol being different to the first communication protocol;
   a user interface operatively coupled to the first device interface, the user interface corresponding to a function performable by the first device, the user interface being operable by a user so as to cause a first control signal to be transmitted by the first device interface; and
   a protocol translator operatively coupled to the first device interface and the second device interface, the protocol translator being configured:
      to convert the input signal received by the second device interface from being in accordance with the second communication protocol to being in accordance with the first communication protocol, thereby producing a second control signal; and
      to provide, for transmission by the first device interface, the second control signal;
   wherein:
      the second device interface is a radio frequency interface comprising a radio frequency transmitter; and
      the first communication protocol is a radio frequency communication protocol.

7. The control device in accordance with claim 6, wherein the first communication protocol is a radio frequency communication protocol selected from the group of radio frequency communication protocols consisting of: a ZigBee communication protocol, a Radio Frequency for Consumer Electronics (RF4CE) communication protocol, Bluetooth, Bluetooth Low Energy, and Wi-Fi.

8. The control device in accordance with claim 6, wherein the second device is a computer selected from the group of computers consisting of: a tablet computer, a desktop personal computer, a laptop computer, a mobile station, an entertainment appliance, a wireless telephone, a smartphone, a netbook, and a video game console.

9. The control device in accordance with claim 6, the control device further comprising one or more attachment components configured for detachably attaching the control device to the second device.

10. The control device in accordance with claim 9, wherein:
the control device further comprises a rechargeable battery for powering components of the control device; and
the attachment components are configured to enable charging of the rechargeable battery by a power source of the second device.

11. The control device in accordance with claim 10, wherein the one or more attachment components comprise one or more magnets, the one or more magnets arranged to be attached to one or more corresponding magnets or metal connectors of the second device, the one or more magnets being configured to enable inductive charging of the rechargeable battery by a power source of the second device.

12. The control device in accordance with claim 9, wherein:
the second device is a tablet computer; and
the one or more attachment components are arranged to enable attachment of the control device to any side of the tablet computer.

13. The control device in accordance with claim 6, wherein the user interface comprises a control element selected from the group of control elements consisting of: one or more remote control keys, a touch screen display, a touch pad, and a click wheel.

14. The control device in accordance with claim 6, wherein the user interface comprises one or more remote control keys selected from the group of remote control keys consisting of: a power on/off control key, a D-pad, a volume control key, a channel changing direction key, a menu key, a back key, and a mute key, and a media playback command key.

15. The control device in accordance with claim 6, wherein:
the control device further comprises one or more sensors operatively coupled to the second device interface; and
the second device interface is further configured to transmit one or more measurement signals corresponding to measurements taken by the one or more sensors, the measurement signals being for use by the second device, the measurement signals being in accordance with the second communication protocol.

16. The control device in accordance with claim 15, wherein the one or more sensors include a sensor selected from the group of sensors consisting of: an accelerometer, a microphone, and a camera.

17. The control device in accordance with claim 6, wherein the first control signal is such that, when it is received by the first device, the first device performs the function.

18. The control device in accordance with claim 6, wherein:
the input signal specifies a further function performable by the first device; and
the second control signal is such that, when it is received by the first device, the first device performs the further function.

19. A method of controlling a first device using a control device, wherein
the control device comprises:
a first device interface for transmitting a control signal for use by the first device, the control signal being in accordance with a first communication protocol, and wherein the first device interface is configured to receive a further input signal from the first device, the further input signal being in accordance with the first communication protocol;
a second device interface for receiving an input signal from a second device, the input signal being in accordance with a second communication protocol, the second communication protocol being different to the first communication protocol, and wherein the second device interface is further configured to transmit an output signal for use by the second device, the output signal being in accordance with the second communication protocol;
a user interface operatively coupled to the first device interface, the user interface corresponding to a function performable by the first device, the user interface being operable by a user so as to cause a first control signal to be transmitted by the first device interface; and
a protocol translator operatively coupled to the first device interface and the second device interface, the protocol translator being configured to convert the input signal received by the second device interface from being in accordance with the second communication protocol to being in accordance with the first communication protocol, thereby producing a second control signal, and to provide, for transmission by the first device interface, the second control signal; to convert the further input signal received by the first device interface from being in accordance with the first communication protocol to being in accordance with the second communication protocol, thereby producing the output signal; and to provide, for transmission by the second device interface, the output signal; and
the first device is remote from the control device;
the method comprising:
operating, by a user, the user interface, the user interface corresponding to a function performable by the first device; and
in response to the user operating the user interface, transmitting, by the first device interface, a control signal for use by the first device, thereby triggering the first device to perform the function; wherein
the control signal is in accordance with the first communication protocol.

20. A method of controlling a first device using a control device, wherein:
the control device comprises:
a first device interface for transmitting a control signal for use by the first device, the control signal being in accordance with a first communication protocol;
a second device interface for receiving an input signal from a second device, the input signal being in accordance with a second communication protocol, the second communication protocol being different to the first communication protocol;
a user interface operatively coupled to the first device interface, the user interface corresponding to a function performable by the first device, the user interface being operable by a user so as to cause a first control signal to be transmitted by the first device interface; and a protocol translator operatively coupled to the first device interface and the second device interface, the protocol translator being configured to convert the input signal received by the second device interface from being in accordance with the second communication protocol to being in accordance with the first communication protocol, thereby producing a second control signal, and to provide, for transmission by the first device interface, the second control signal; and the first device is remote from the control device;

the method comprising:

receiving, by the first device interface, a further input signal from the first device, the further input signal being in accordance with the first communication protocol;

converting, by the integrated protocol translator, the further input signal from being in accordance with the first communication protocol to being in accordance with the second communication protocol, thereby producing an output signal;

transmitting, by the second device interface, the output signal for use by the second device;

receiving, by the second device, the output signal;

using the output signal, ascertaining, by the second device, that the first device may perform the further function;

receiving, by the second device interface, an input signal from a second device, the input signal being in accordance with the second communication protocol;

converting, by the integrated protocol translator, the input signal from being in accordance with the second communication protocol to being in accordance with the first communication protocol, thereby producing a control signal; and transmitting, by the first device interface, the control signal for use by the first device, thereby triggering the first device to perform the function.

* * * * *